Wilhelm & Ensign,
Furniture Caster.

N° 51,770. Patented Dec. 26, 1865.

Witnesses:
Geo. L. Chafin
Abert Hoyad

Inventor:
John H. Wilhelm
Frederick G. Ensign

UNITED STATES PATENT OFFICE.

J. H. WILHELM AND FREDK. G. ENSIGN, OF CHICAGO, ILLINOIS.

CASTER FOR FURNITURE.

Specification forming part of Letters Patent No. 51,770, dated December 26, 1865.

*To all whom it may concern:*

Be it known that we, JOHN H. WILHELM and FREDERICK G. ENSIGN, of Chicago, in the county of Cook, in the State of Illinois, have invented an Improved Combination Spring and Caster for Furniture; and we do hereby declare that the following is a full and exact description thereof, reference being had to the accompanying drawings, and to the letters of reference marked thereon, in which—

Figure 1:
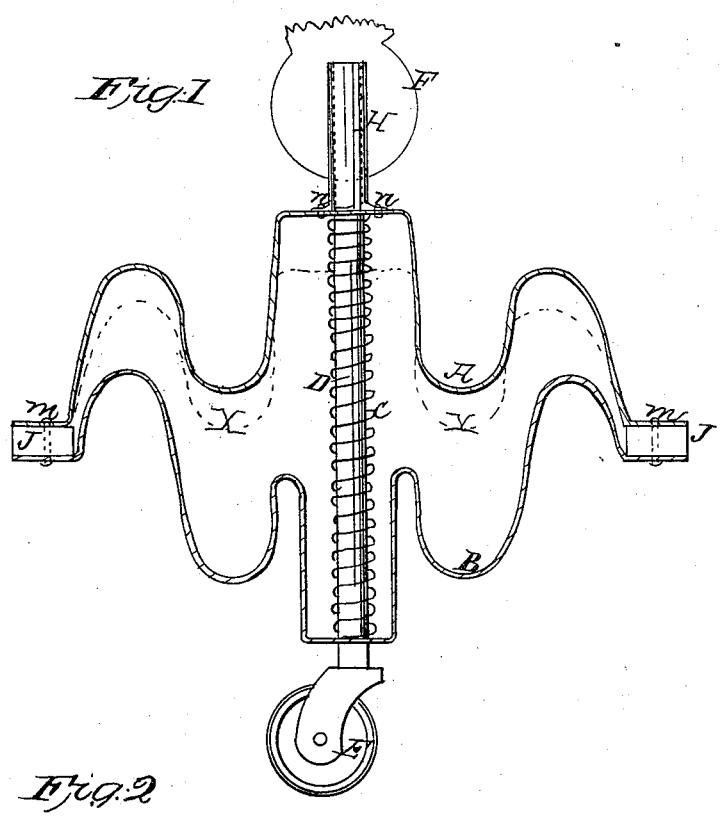
Figure 2:

Figure 1 is a longitudinal elevation of our improved combination spring and caster for furniture. Fig. 2 is a top or plan view of the same.

The object of our invention is to furnish for bedsteads, chairs, and heavy articles of furniture a combination-spring consisting of two or more curvilinear parts corresponding to each other, so constructed as to give a great extent of spring within a small space, and so to arrange the device that the common caster-wheel with its proper attachments or stem may be easily adjusted to it and connected with the furniture, the whole arrangement being designed to obviate a large portion of the elastic surface required in the ordinary method of upholstering.

To enable others skilled in the art to make and use our invention, we will describe the method of constructing and using the same.

A represents the upper spring, and B the lower spring, which are made in a curvilinear form, so that pressure on the upper spring, A, forces it down into a similar curve in the lower spring, B, as shown by the dotted lines *x x*, the object of which is to allow the springs A B to move through considerable space without their centers coming in contact.

J represents blocks inserted between the ends of the springs A B and secured by the bolts *m*, for the purpose of securing the ends of the springs A B and adjusting the same at a proper distance from each other to secure the required elasticity.

H represents the socket attached to the upper spring, A, by means of the rivets or screws *n*, which is designed to be inserted into the end of the bedstead or furniture leg in the usual manner.

D represents the stem or shaft of the caster-wheel E, and passes up through the inside of the socket H when the springs A B are pressed together. At the lower end of the stem or shaft D is attached the common caster-wheel E, which revolves in the usual manner by means of the socket H and a hole forming a bearing through the center of the lower part of the spring B.

The red line F represents the contour of the lower end of the furniture-leg, in which the socket H is supposed to be inserted.

C shows the helical spring coiled round the stem D, between the springs A B, for the purpose of giving additional elastic power to the device.

The metals used for the springs A B are rolled brass or spring-steel. The blocks J are made of either wood or metal. The other parts are made of any desired metallic substance.

Operation: When our device is constructed as above described, all that remains to be done is to insert the socket H in a hole made in the usual manner in the end of the furniture-leg.

Having thus described our invention, what we claim as new, and desire to secure by Letters Patent of the United States, is—

The combination of the curvilinear springs A B, adjusted to the stem D of the caster-wheel E and strengthened by the helical spring C, as set forth.

JOHN H. WILHELM.
FREDERICK G. ENSIGN.

Witnesses:
GEO. L. CHAPIN,
ALBERT HAYARD.